US008078113B2

(12) United States Patent
Takatori et al.

(10) Patent No.: US 8,078,113 B2
(45) Date of Patent: Dec. 13, 2011

(54) ADAPTIVE ANTENNA CONTROL METHOD AND ADAPTIVE ANTENNA TRANSMISSION/RECEPTION CHARACTERISTIC CONTROL METHOD

(75) Inventors: Yasushi Takatori, Kanagawa (JP); Keizo Cho, Kanagawa (JP); Toshikazu Hori, Kanagawa (JP); Kentaro Nishimori, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1073 days.

(21) Appl. No.: 11/975,245

(22) Filed: Oct. 17, 2007

(65) Prior Publication Data

US 2008/0280634 A1 Nov. 13, 2008

Related U.S. Application Data

(62) Division of application No. 09/941,399, filed on Aug. 28, 2001, now Pat. No. 7,302,232.

(30) Foreign Application Priority Data

Sep. 1, 2000 (JP) ................................. 2000-265776

(51) Int. Cl.
*H04B 1/00* (2006.01)
*H04B 15/00* (2006.01)
(52) U.S. Cl. ...... 455/63.4; 455/25; 455/63.1; 455/562.1; 455/452.1; 455/575.7; 370/317; 342/74; 343/700 R
(58) Field of Classification Search ................. 455/63.4, 455/25, 63.1, 271, 562.1, 452.1, 561, 575.7; 370/317; 375/304; 342/74, 153, 383; 343/700 R
See application file for complete search history.

(56) References Cited

U.S. PATENT DOCUMENTS

| 5,566,355 | A | * | 10/1996 | Kanai .............................. 445/25 |
| 6,556,839 | B1 | | 4/2003 | Kondo .......................... 455/522 |
| 6,577,875 | B1 | | 6/2003 | Brouwer ...................... 455/522 |
| 6,584,302 | B1 | | 6/2003 | Hottinen et al. ............... 455/69 |

(Continued)

FOREIGN PATENT DOCUMENTS

EP 0 843 380 A2 5/1998

(Continued)

OTHER PUBLICATIONS

"TDMA Communications; 2.2.2. CDMA," pp. 12-14, Apr. 5, 1989.

(Continued)

*Primary Examiner* — Shaima Q Aminzay
(74) *Attorney, Agent, or Firm* — Blakely, Sokoloff, Taylor & Zafman

(57) ABSTRACT

An adaptive antenna control method is used for a radio communication system built by a plurality of radio base stations and a plurality of terminal stations capable of communicating with the radio base stations. Each radio base station includes an adaptive antenna having a plurality of antenna elements, a distributor for generating signals to be input to the plurality of antenna elements by branching a signal of one system to be transmitted, and weighting circuits for respectively weighting transmission signals to the plurality of antenna elements. For reception by each terminal station, an interference wave power given by the transmission signal from each of the plurality of radio base stations is estimated. A weight in the adaptive antenna of each radio base station is determined to minimize a sum of square errors between reception signals and desired signals for all the radio base stations which simultaneously use the same communication channel. An adaptive antenna transmission/reception characteristic control method is also disclosed.

14 Claims, 10 Drawing Sheets

U.S. PATENT DOCUMENTS

| | | | |
|---|---|---|---|
| 6,690,944 B1 | 2/2004 | Lee et al. | 455/522 |
| 6,714,584 B1 | 3/2004 | Ishii et al. | 375/148 |
| 6,792,251 B2 | 9/2004 | Johannisson et al. | 455/126 |
| 7,058,418 B2 | 6/2006 | Doi et al. | 455/500 |
| 7,069,054 B2 | 6/2006 | Doi et al. | 455/562.1 |
| 7,110,795 B2 | 9/2006 | Doi | 455/562.1 |
| 2002/0003833 A1 | 1/2002 | Usuda et al. | 375/144 |
| 2002/0031105 A1 | 3/2002 | Zeira et al. | 370/337 |
| 2002/0041202 A1 | 4/2002 | Katz et al. | 329/311 |
| 2003/0003937 A1 | 1/2003 | Ohkubo et al. | 455/517 |
| 2003/0171134 A1 | 9/2003 | Doi et al. | 455/550.1 |
| 2004/0009784 A1 | 1/2004 | Ohkubo et al. | 455/522 |
| 2006/0073801 A1 | 4/2006 | Wang et al. | 455/226.1 |

FOREIGN PATENT DOCUMENTS

| | | |
|---|---|---|
| EP | 1 322 049 A1 | 6/2003 |
| JP | 7-066768 | 3/1995 |
| JP | 07066768 | 3/1995 |
| JP | 09219615 | 8/1997 |
| JP | 11243358 | 9/1999 |
| JP | 2001-285163 | 10/2001 |
| WO | WO 94/09568 | 4/1994 |

OTHER PUBLICATIONS

"Fundamentals of Mobile Communications," pp. 195-196, Oct. 1, 1986.

* cited by examiner

ADAPTIVE ANTENNA CONTROL METHOD AND ADAPTIVE ANTENNA TRANSMISSION/RECEPTION CHARACTERISTIC CONTROL METHOD

The present patent application is a Divisional of Application No. 09/941,399, filed Aug. 28, 2001 now U.S. Pat. No. 7,302,232.

BACKGROUND OF THE INVENTION

The present invention relates to an adaptive antenna control method and adaptive antenna transmission/reception characteristic control method, which can be used to, e.g., improve the frequency use efficiency in a radio communication system having a plurality of base stations by suppressing interference from a neighboring base station.

In a radio communication system that forms a planar service area, such as a mobile communication system, radio zones formed by a number of base stations are combined to construct a wide service area. Radio zones formed at separate positions simultaneously use the same frequency as radio signals. With this method, the frequency use efficiency can be improved.

Forming hexagonal zones is most effective to minimize, in each radio zone, interference from the remaining radio zones.

For example, as indicated by reference (Okumura and Shinji, "Fundamentals of Mobile Communications", p. 195), when a service area is constructed by hexagonal zones, the number K of frequencies required by this radio communication system is given by $$K=(1/3)\times(D/R)^2$$

D: the distance between base stations of cells (radio zones) which use the same frequency R: the radius of a cell When each cell has a regular hexagonal shape, (D/R>3) must hold. Hence, the number K of frequencies is at least three.

For the above reason, to provide a communication service in a wide service area using a conventional typical radio communication system, at least three radio frequencies must be used.

When an adaptive antenna is employed, interference from another radio zone that uses the same frequency can be suppressed.

For example, a typical adaptive antenna as shown in reference (R. A. Monzingo and T. W. Miller, "Introduction to Adaptive Arrays", John Wiley & Sons, Inc. 1980) has an arrangement shown in FIG. 9.

Referring to FIG. 9, this adaptive antenna comprises N antenna elements 901(1) to 901(N), weighting circuits 902(1) to 902(N) and 912(1) to 912(N), weight control unit 903, reference signal generation unit 904, divider/combiner 905, and distributor 913.

The weighting circuits 902(1) to 902(N) and divider/combiner 905 are used for reception. The weighting circuits 912(1) to 912(N) and distributor 913 are used for transmission. Each weighting circuit 902 weights the signal from a corresponding antenna element 901 with a complex number. The weight control unit 903 controls the value of the weight to be supplied to each weighting circuit 902 or 912. The divider/combiner 905 generates a signal by combining the signals of N systems, which are weighted by the respective weighting circuits 902. The distributor 913 distributes a signal to be transmitted to systems equal in number to the antenna elements 901.

When signals received by the antenna elements 901(1) to 901(N) are represented by x(1) to x(N), the values of weights in the weighting circuits 902(1) to 902(N) are represented by w(1) to w(N), and a desired signal component is represented by d, a weight WOPT for minimizing the error between the desired signal component d and the reception signal obtained at the output of the divider/combiner 905 is given by $$W_{opt} = R_{xx}^{-1} r_{xd} \qquad (13)$$

$$R_{xx} = E[X^* X^T] \qquad (14)$$

$$r_{xd} = \begin{pmatrix} \overline{x(1) \cdot d^*} \\ \overline{x(2) \cdot d^*} \\ \vdots \\ \overline{x(N) \cdot d^*} \end{pmatrix} \qquad (15)$$

$$X = \begin{pmatrix} x(1) \\ x(2) \\ \vdots \\ x(N) \end{pmatrix} \qquad (16)$$

$$W_{opt} = \begin{pmatrix} w_{opt}(1) \\ w_{opt}(2) \\ \vdots \\ w_{opt}(N) \end{pmatrix}$$

where
suffix *: conjugate transposition
suffix T: transposition
E[·]: expected value
X: input signal vector
x(i): reception signal of ith antenna element
d: desired signal
$w_{opt}(i)$: weight for ith antenna element When the directional pattern of the antenna is controlled by generating such a weight, a null is formed in the directional pattern with respect to the direction of an interference station. Hence, the influence of the interference wave from the interference station can be suppressed. A "null" means that the radiation field or reception field strength becomes 0.

By installing an adaptive antenna in a base station, even when, e.g., communication is executed using the same radio frequency in adjacent radio zones, the influence of an interference wave from a neighboring radio zone can be suppressed.

However, assume that a base station uses an adaptive antenna, and another base station (interference station) that uses the same frequency as that of the n station (base station) is present in the direction of a target terminal station viewed from the base station. In this case, if the directional pattern of the antenna is controlled to suppress the influence of the interference wave from the interference station, the signal from the target terminal station is also suppressed, and the transmission quality inevitably degrades.

In a radio communication system, limited frequency resources must be effectively used. However, in a radio communication system which provides a radio communication service in a wide range using a plurality of base stations, as described above, since interference from a neighboring zone to a given base station and interference from the given base station to the neighboring zone are present, zones adjacent to each other cannot use the same frequency.

When an adaptive antenna is used, the interference wave from a neighboring zone can be suppressed, and therefore, the same radio frequency can be used in adjacent radio zones. However, no sufficient interference reduction capability can be obtained only with the control of a conventional adaptive antenna. Especially, when a target terminal station is present in the direction of the zone of the neighboring base station, the interference unavoidably increases.

SUMMARY OF THE INVENTION

It is an object of the present invention to provide an adaptive antenna control method and adaptive antenna transmission/reception characteristic control method capable of improving the frequency use efficiency in a radio communication system.

In order to achieve the above object, according to the present invention, there is provided an adaptive antenna control method used for a radio communication system built by a plurality of radio base stations and a plurality of terminal stations capable of communicating with the radio base stations, each radio base station including an adaptive antenna having a plurality of antenna elements, a distributor for generating signals to be input to the plurality of antenna elements by branching a signal of one system to be transmitted, and weighting circuits for respectively weighting transmission signals to the plurality of antenna elements, wherein for reception by each terminal station, an interference wave power given by the transmission signal from each of the plurality of radio base stations is estimated, and a weight in the adaptive antenna of each radio base station is determined to minimize a sum of square errors between reception signals and desired signals for all the radio base stations which simultaneously use the same communication channel.

DESCRIPTION OF THE PREFERRED EMBODIMENTS

The present invention will be described below with reference to the accompanying drawings.

First Embodiment

An adaptive antenna control method according to an embodiment of the present invention will be described with reference to FIGS. 1 to 3, 6, and 7. This first embodiment corresponds to claims 1 to 4 and 6 to 9.

Figure 1:
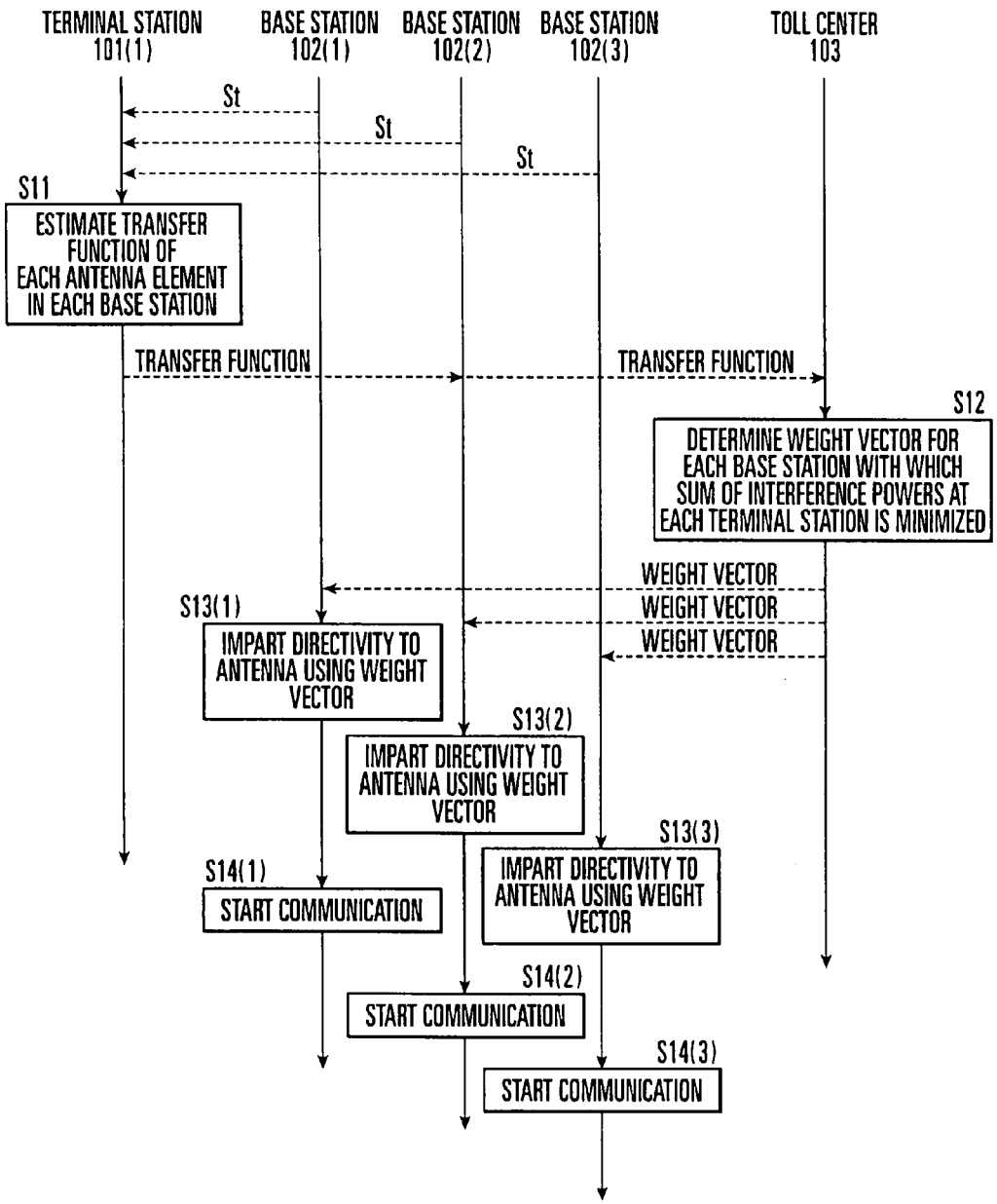
FIG. 1 is a sequence chart showing the control sequence of an adaptive antenna control method related to a downlink according to the first embodiment.
Figure 2:
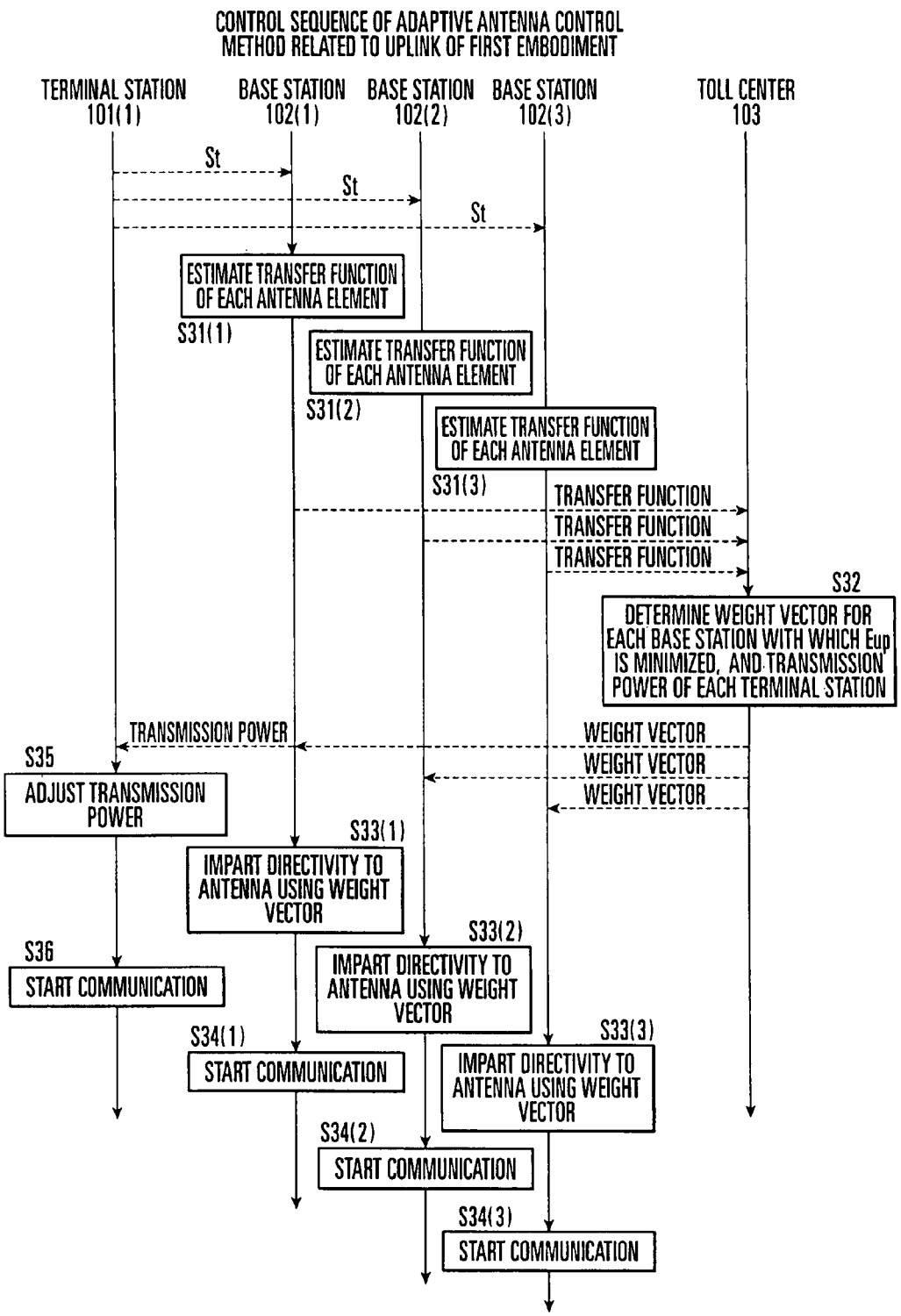
FIG. 2 is a sequence chart showing the control sequence of the adaptive antenna control method related to an uplink according to the first embodiment.
Figure 3:
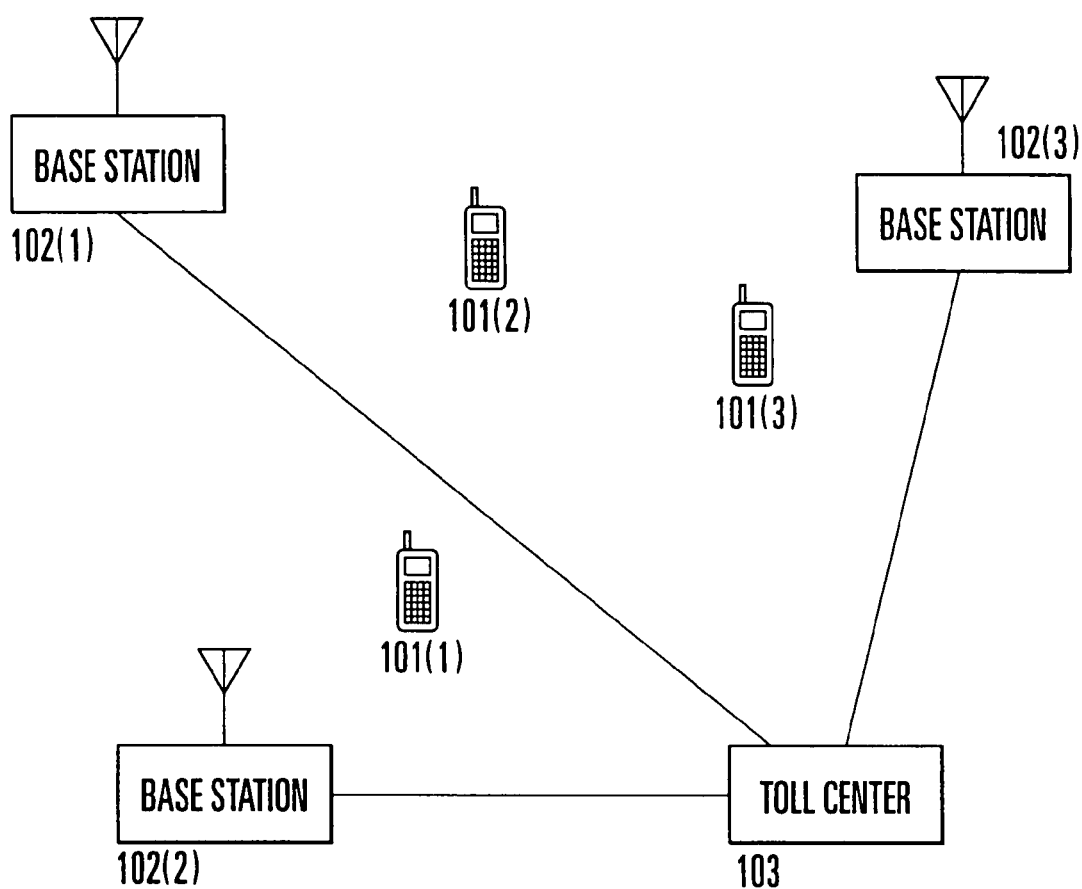
FIG. 3 is a block diagram showing the arrangement of a communication system.
Figure 6:
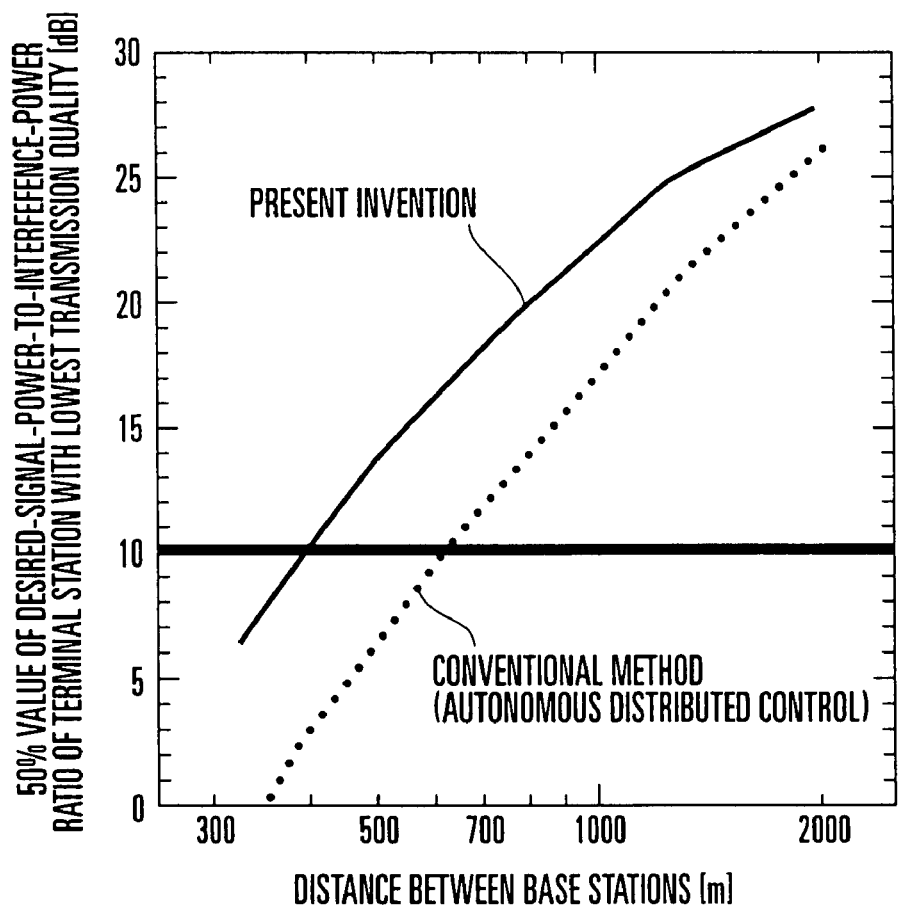
FIG. 6 is a graph showing the characteristic of the downlink of the first embodiment.
Figure 7:
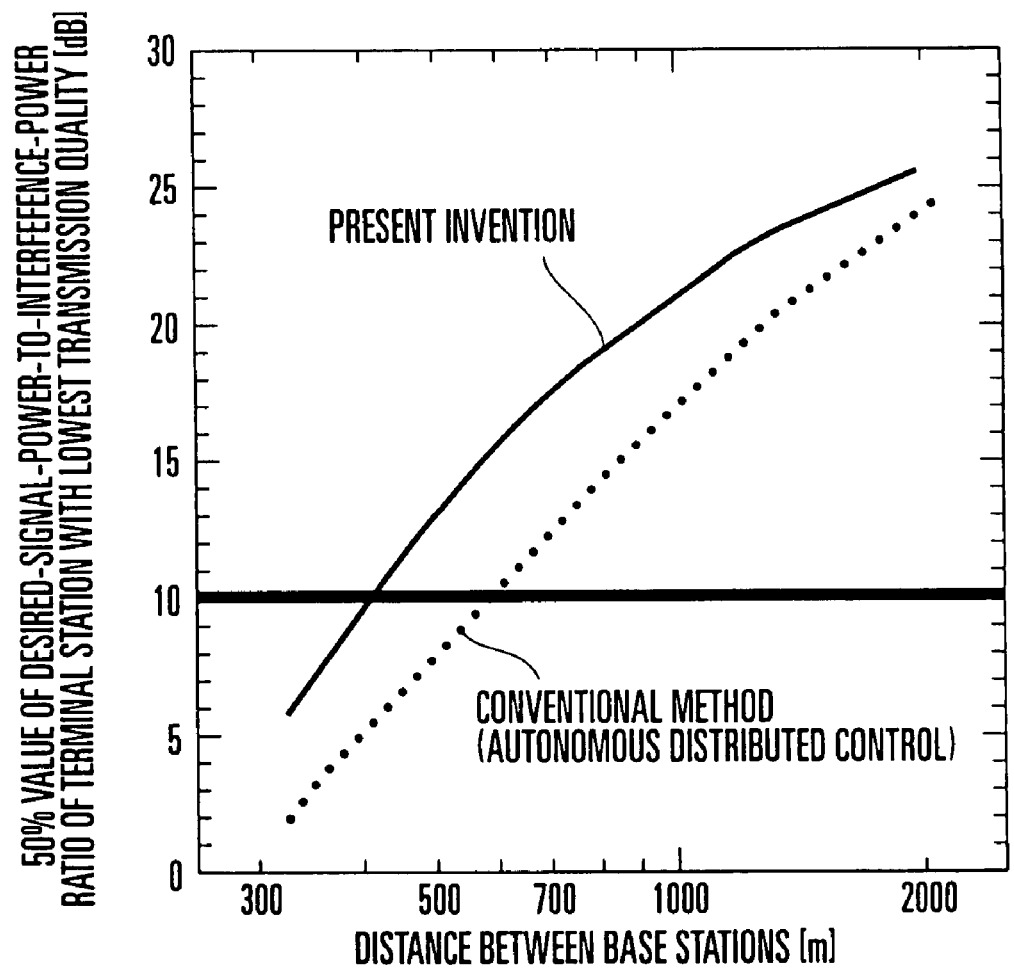
FIG. 7 is a graph showing the characteristic of the uplink of the first embodiment.

FIG. 1 shows the control sequence of the adaptive antenna control method related to a downlink according to the first embodiment. FIG. 2 shows the control sequence of the adaptive antenna control method related to an uplink according to the first embodiment. FIG. 3 shows the arrangement of a communication system. FIG. 6 shows the characteristic of the downlink of the first embodiment. FIG. 7 shows the characteristic of the uplink of the first embodiment.

In the first embodiment, assume that the present invention is applied to control a communication system as shown in FIG. 3. That is, a plurality of terminal stations 101 are present in a relatively narrow area. Each terminal station 101 can execute radio communication with a plurality of base stations 102. That is, each terminal station 101 can communicate with another terminal through any one of the base stations 102.

In this example, assume that the plurality of terminal stations 101 and the plurality of base stations 102 simultaneously use the same communication channel, and space division multiple transmission is implemented using, e.g., the directivity of an antenna. For these purposes, each base station 102 has an adaptive antenna which basically has the same arrangement as that shown in FIG. 9. Additionally, in this example, assume that each terminal station 101 has a transmission power adjustment function.

The plurality of base stations 102 are connected to an intensive control station 103 through a wired network. The base stations 102 and intensive control station 103 may be connected through a wireless network. The intensive control station 103 concentrically controls the plurality of base stations 102 and the plurality of terminal stations 101 and controls the directional pattern of the antenna in each base station 102 and the transmission power of each terminal station 101.

In the example shown in FIG. 3, three terminal stations 101 and three base stations 102 are controlled. However, the number of terminal stations 101 and the number of base stations 102 are changed as needed. For the adaptive antennaes, the plurality of base stations 102 need not always have antenna elements in equal number. Control of a downlink related to communication from the base station 102 to the terminal station 101 and control of an uplink related to communication from the terminal station 101 to the base station 102 are independently executed.

Downlink control will be described first with reference to FIG. 1. For the descriptive convenience, this example assumes that the base station 102(2) and terminal station 101(1) communicate, and control is executed to suppress the interference for reception at the terminal station 101(1) by signals transmitted from the remaining two base stations 102 (1) and 102(3) which use the same communication channel.

Referring to FIG. 1, first, each of the base stations 102(1), 102(2), and 102(3) transmits a predetermined known signal St to the terminal station 101(1). In this case, the signals St are transmitted using different communication channels. That is, communication channels for which at least one of the frequency, timing, and spreading code is different are used.

In step S11, the terminal station 101(1) checks the correlation between the signal (St) held by itself and each of the reception signals received from the base stations 102 via the different communication channels, thereby estimating a transfer function. A transfer function is obtained for each antenna element of each base station 102.

To estimate a transfer function, a method indicated by, e.g., reference (D. Gerlach and A. Paulraj, Acoustics, Speech and Signal Processing, ICASSP, vol. 4, pp. IV/97-IV100, 1994) is used.

All transfer functions estimated by the terminal station 101(1) are transferred to the intensive control station 103 through the base station 102(2) in this case. On the basis of the transfer function received for each base station, the intensive control station 103 determines a weight vector for the adaptive antenna in each of the base stations 102(1), 102(2), and 102(3) such that the interference power at the terminal station 101(1) is minimized.

Assume that the nth base station 102 communicates with the mth terminal station 101. An interference power U(m) received by the mth terminal station 101 is given by $$U(m) = \sum_{\substack{k=1 \\ (k \neq n)}}^{N} \left| \sum_{j=1}^{P} wd(k, j) Vd(m, k, j) \right|^2 \quad (21)$$

wd(k,j): weight for antenna element in downlink
Vd(m,k,j): transfer function of antenna element in downlink
P: number of antenna elements
N: number of base stations When the plurality of terminal stations 101 are simultaneously communicating, the interference is preferably reduced for the entire system. For example, in a communication channel with a lowest transmission quality, the transmission power of the base station 102 is preferably increased. In a communication channel with a high transmission quality, no problem is posed even when the transmission power of the base station 102 is suppressed.

To control the interference on the plurality of terminal stations 101 altogether, the intensive control station 103 executes control by obtaining an evaluation index Edown of the entire downlink from $$Edown = \sum_{k=1}^{K} U(k) \quad (22)$$

K: number of terminal stations

That is, the intensive control station 103 selects a combination of weight vectors for the base stations 102, with which the evaluation index Edown is minimized, thereby suppressing degradation in transmission quality due to the interference to the minimum.

As shown in FIG. 1, the weight vectors determined by the intensive control station 103 are transferred to the base stations 102(1), 102(2), and 102(3). Each of the base stations 102(1), 102(2), and 103(3) supplies to a weighting circuit 912 of the adaptive antenna the weight vector assigned to itself by the intensive control station 103. With this processing, the directional patterns of the antennas of the base stations 102 (1), 102(2), and 102(3) are determined.

The characteristic of the downlink in executing the control shown in FIG. 1 was simulated using a computer. FIG. 6 shows the result compared with a conventional method. This simulation was done assuming the following conditions. All base stations and terminal stations were completely synchronized, and the base stations and terminal stations transmitted signals with the same frequency, timing, and spreading code.

Radius of cell formed by base station: 250 m
Number of antenna elements of adaptive antenna of each base station: 4 elements
Layout of antenna elements: circular array
Directivity of antenna element:
omni-directional in horizontal plane
Antenna element spacing: 0.5 λ
Delay profile: exponential model
Delay spread: 0.1 symbol length
Number of base stations: 36
Number of terminal stations: 36
Angular spread of incoming wave: 120°

For the conventional method, assume that the adaptive antennaes were individually controlled for the respective base stations, as shown in, e.g., reference (R. A. Monzingo and T. W. Miller, "Introduction to Adaptive Arrays", John Wiley & Sons, Inc. 1980).

The layout of the terminal stations was changed 100 times at random, and the 50% value of the cumulative probability of the transmission quality of a terminal station with a lowest transmission quality was evaluated. In addition, assume that one terminal station executed transfer function estimation with respect to each of three base stations. The number of times of weight update by the algorithm of the present invention was 100.

Referring to FIG. 6, the distances between base stations are compared about the characteristics at 10 dB of the ordinate. The distance between base stations is 600 m for the conventional autonomous distributed control. However, it can be shortened to 400 m, i.e., about ⅔ or less, in the present invention.

That is, when the adaptive antennaes of a plurality of base stations are controlled altogether, the transmission quality of a communication channel whose transmission quality considerably degrades can be improved, and the interference in the downlink can be reduced in the entire system Uplink control will be described next with reference to FIG. 2. For the descriptive convenience, this example assumes that the base station 102(1) and terminal station 101(1) communicate, and control is executed to suppress the interference for reception at the base station 102(1) by signals transmitted from the remaining two terminal stations 101(2) and 101(3) which use the same communication channel and also to reduce interference for all the plurality of base stations 102(1), 102(2), and 102(3).

Although the terminal stations 101(2) and 101(3) are not illustrated in FIG. 2, they perform the same operation of that of the terminal station 101(1). Referring to FIG. 2, first, the terminal station 101(1) transmits the predetermined known signal St to each of the base stations 102(1), 102(2), and 102(3). In this case, the signals St are transmitted using different communication channels. That is, communication channels for which at least one of the frequency, timing, and spreading code is different are used.

In step S31, each of the base stations 102(1), 102(2), and 102(3) checks the correlation between the signal (St) held by itself and the reception signal received from the terminal station 101(1), thereby estimating a transfer function. A transfer function is obtained for each antenna element of each base station 102. In addition, the base stations 102(1), 102(2), and 102(3) individually estimate transfer functions for each of the plurality of terminal stations 101(1), 101(2), and 101(3).

To estimate a transfer function, a method indicated by, e.g., reference (D. Gerlach and A. Paulraj, Acoustics, Speech and Signal Processing, ICASSP, vol. 4, pp. IV/97- IV100, 1994) is used. All transfer functions estimated by the base stations 102(1), 102(2), and 102(3) are transferred to the intensive control station 103.

On the basis of the transfer function received for each antenna element, each base station, or each terminal station, the intensive control station 103 determines a weight vector for the adaptive antenna in each of the base stations 102(1), 102(2), and 102(3) and the transmission power of each of the terminal stations 101(1), 101(2), and 101(3) such that the interference power at all the base stations 102(1), 102(2), and 102(3) is minimized.

Assume that the nth base station 102 communicates with the mth terminal station 101. An interference power U(n) that the nth base station 102 receives from the plurality of terminal stations 101 other than the mth terminal station 101 is given by $$U(n) = \sum_{k=1(k \neq m)}^{K} \left| \sum_{j=1}^{P} wu(k, j) Vu(m, k, j) \right|^2 \quad (23)$$

wu(k,j): weight for antenna element in uplink
Vu(m,k,j): transfer function of antenna element in uplink
P: number of antenna elements
N: number of base stations When the plurality of base stations 102 are simultaneously communicating, the interference is preferably reduced for the entire system. For example, when the interference power at the base station 102(1) is small but that at the base station 102(2) is large, the transmission quality in the entire communication system degrades, and this need be improved. Hence, in a communication channel with a lowest transmission quality, the transmission power of the terminal station 101 is preferably increased. In a communication channel with a high transmission quality, no problem is posed even when the transmission power of the terminal station 101 is suppressed.

To control the interference on the plurality of base stations 102 altogether, the intensive control station 103 executes control by obtaining an evaluation index Eup of the entire uplink from $$Eup = \sum_{k=1}^{N} U(k) \quad (24)$$

N: number of base stations

That is, the intensive control station 103 selects a combination of weight vectors for the base stations 102 and a combination of transmission powers of the terminal stations 101, with which the evaluation index Eup is minimized, thereby suppressing degradation in transmission quality due to the interference to the minimum.

As shown in FIG. 2, the weight vectors determined by the intensive control station 103 are transferred to the base stations 102(1), 102(2), and 102(3). In addition, the values of transmission powers determined by the intensive control station 103 are transferred to the terminal stations 101 through the base stations 102.

Each of the base stations 102(1), 102(2), and 103(3) supplies to the weighting circuit 912 of the adaptive antenna the weight vector assigned to itself by the intensive control station 103. With this processing, the directional patterns of the antennas of the base stations 102(1), 102(2), and 102(3) are determined. Each terminal station 101 adjusts its transmission power in accordance with the transmission power assigned by the control of the intensive control station 103.

The characteristic of the uplink in executing the control shown in FIG. 2 was simulated using a computer. FIG. 7 shows the result compared with a conventional method. This simulation was done assuming the following conditions.

All base stations and terminal stations were completely synchronized, and the base stations and terminal stations transmitted signals with the same frequency, timing, and spreading code.
Radius of cell formed by base station: 250 m
Number of antenna elements of adaptive antenna of each base station: 4 elements
Layout of antenna elements: circular array
Directivity of antenna element:
omni-directional in horizontal plane
Antenna element spacing: 0.5 λ
Delay profile: exponential model
Delay spread: 0.1 symbol length
Number of base stations: 36
Number of terminal stations: 36
Angular spread of incoming wave: 120°

For the conventional method, assume that the adaptive antennaes were individually controlled for the respective base stations, and each terminal station controlled its transmission power such that the reception level at the base station had a predetermined value.

The layout of the terminal stations was changed 100 times at random, and the 50% value of the cumulative probability of the transmission quality of a terminal station with a lowest transmission quality was evaluated. In addition, assume that one terminal station executed transfer function estimation with respect to each of three base stations. The number of times of weight update by the algorithm of the present invention was 100.

Referring to FIG. 7, the distances between base stations are compared about the characteristics at 10 dB of the ordinate. The distance between base stations is 600 m for the conventional autonomous distributed control. However, it can be shortened to 400 m, i.e., about ⅔ or less, in the present invention.

That is, when the adaptive antennaes of a plurality of base stations are controlled altogether, the transmission quality of a communication channel whose transmission quality considerably degrades can be improved, as in the downlink, and the interference in the uplink can be reduced in the entire system Second Embodiment An adaptive antenna control method according to another embodiment of the present invention will be described with reference to FIGS. 4, 5, and 8. This second embodiment corresponds to claims 5 and 10.

Figure 4:
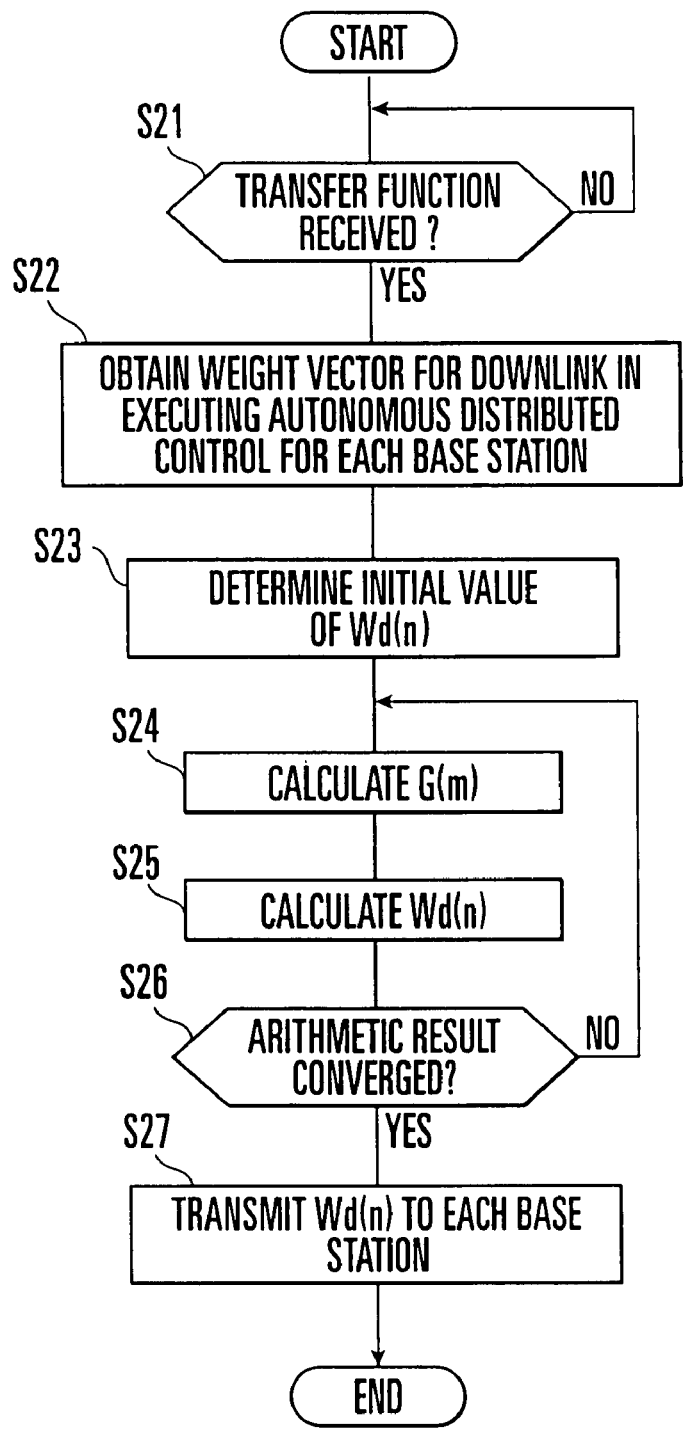
FIG. 4 is a flow chart showing control of an intensive control station related to a downlink according to the second embodiment.
Figure 5:
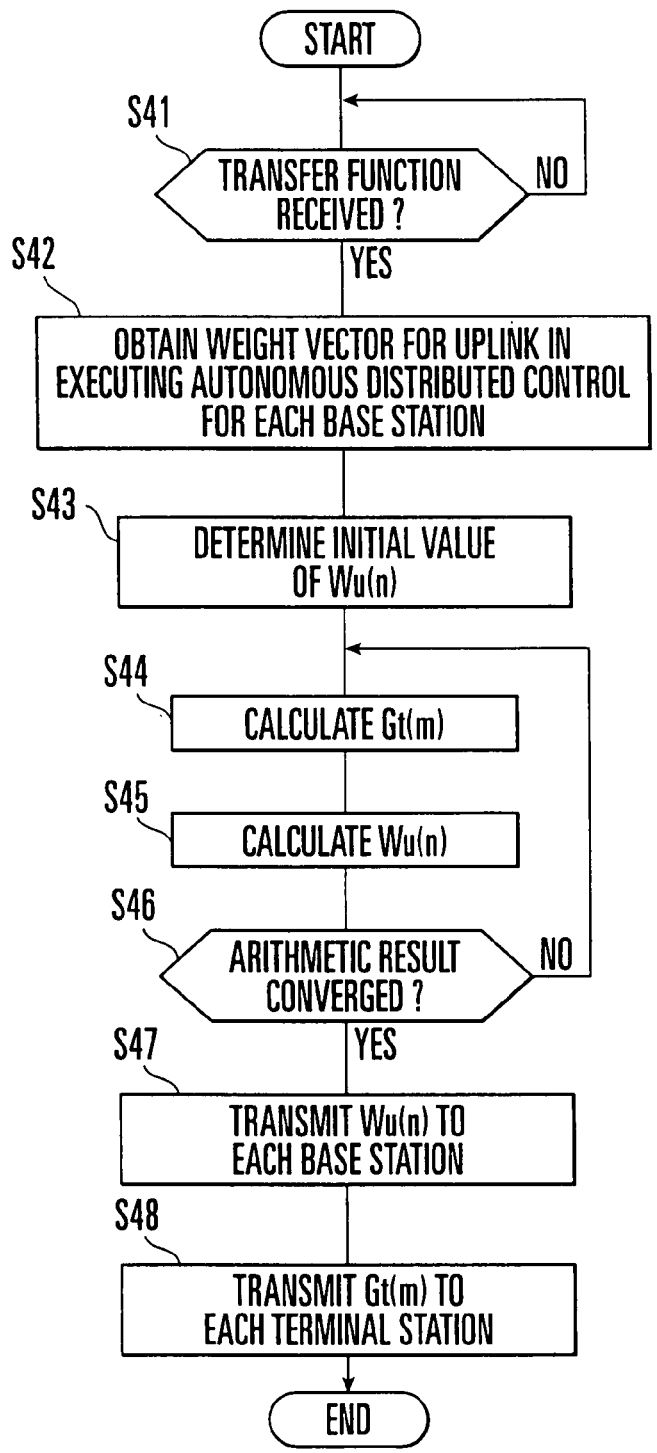
FIG. 5 is a flow chart showing control of the intensive control station related to an uplink according to the second embodiment.

FIG. 4 shows control of an intensive control station related to a downlink according to the second embodiment FIG. 5 shows control of the intensive control station related to an uplink according to the second embodiment.

Figure 8:
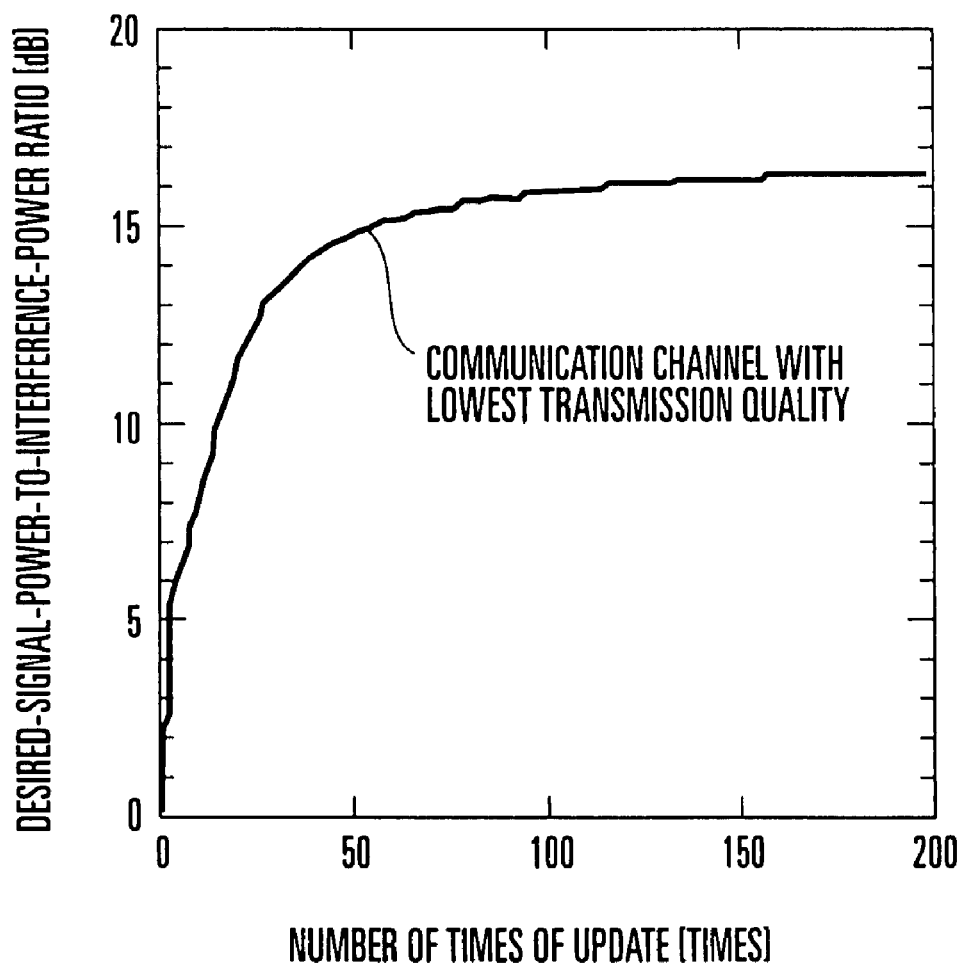
FIG. 8 is a graph showing the characteristic of the second embodiment.

FIG. 8 shows the characteristic of the second embodiment. The second embodiment is a modification to the first embodiment. The second embodiment is the same as the first embodiment except that the contents of control by an intensive control station 103 are changed as shown in FIGS. 4 and 5. For the same parts as in the first embodiment, a description thereof will be omitted.

Control of the downlink will be described first with reference to FIG. 4. As in FIG. 1, transfer functions estimated by a terminal station 101(1) are input to the intensive control station 103 through base stations 102. On the basis of the transfer functions, the intensive control station 103 determines the downlink directional pattern of the antenna of each base station 102. When transfer functions necessary for control are input, processing by the intensive control station 103 advances from step S21 to S22. In step S22, a conventional adaptive antenna control algorithm (e.g., R. A. Monzingo and T. W. Miller, "Introduction to Adaptive Arrays", John Wiley & Sons, Inc. 1980) is applied to each base station 102, thereby obtaining the downlink weight vector of the adaptive antenna of each base station 102 for autonomous distributed control.

$$Wd(n) = G(m)\left(\sum_{k=1}^{K} G(k)^2 Vd(k,n)Vd(k,n)^H\right)^{-1} Vd(m,n) \quad (25)$$

$$G(m) = \frac{\mathrm{Re}(Wd(n)^H Vd(m,n))}{\sum_{k=1}^{N}(Wd(k)^H Vd(m,k)Vd(m,k)^H Wd(k)) + |\sigma(m)|^2} \quad (26)$$

where
σ(m): noise power of mth terminal station
Re: real number portion
suffix H: complex conjugate transposition $$Wd(n) = \begin{pmatrix} wd(n,1) \\ wd(n,2) \\ \vdots \\ wd(n,P) \end{pmatrix}$$

wd(n,1) to wd(n,P): weights for antenna elements
P: number of antenna elements of nth base station
Vd(m,n): transfer function vector of downlink communication between mth terminal station and nth base station $$Vd(m,n) = \begin{pmatrix} vd(m,n,1) \\ vd(m,n,2) \\ \vdots \\ vd(m,n,P) \end{pmatrix}$$

vd(m,n,1) to vd(m,n,P): transfer functions of antenna elements
N: number of base stations
K: number of terminal stations
Assume communication between nth base station and mth terminal station In step S23, the weight vector obtained in step S22 is substituted as an initial value into a weight vector Wd(n) of equation (25). In step S24, a gain G(m) of equation (26) is calculated. In step S25, the weight vector Wd(n) of equation (25) is re-calculated using the gain G(m).

Until the arithmetic result converges, calculations in steps S24 and S25 are alternately repeated. In step S26, it is identified whether the arithmetic result has converged. For this determination, for example, a signal-to-interference-power ratio in a communication channel with a lowest transmission quality is compared with a predetermined threshold value. That is, it can be regarded that the arithmetic result has converged when the transmission quality of a most degraded communication channel exceeds the lower limit value.

When the arithmetic result has converged, the flow advances from step S26 to S27 to transmit the weight vector Wd(n) as the final arithmetic result to each base station 102.

In the second embodiment as well, the directional patterns of the antennas of the plurality of base stations 102 can be controlled altogether.

An arithmetic result convergence characteristic in executing the control shown in FIG. 4 was simulated using a computer. FIG. 8 shows the result. This simulation was done assuming the following conditions.
Number of base stations: 2
Number of terminal stations: 2
Distance between base stations: 500 m Also assume that the transfer functions could be estimated without any error. Referring to FIG. 8, the control shown in FIG. 4 does not diverge but converge with update about 100 times. An interference characteristic in employing the control shown in FIG. 4 was simulated, and consequently, a result that completely matched FIG. 6 was obtained.

That is, even in executing the control shown in FIG. 4, the downlink directional patterns of the base stations can be determined altogether such that the total interference power in the plurality of communication channels is minimized, as in the first embodiment.

Control of the uplink will be described first with reference to FIG. 5. As in FIG. 2, transfer functions estimated by each base station 102 are input to the intensive control station 103. On the basis of the transfer functions, the intensive control station 103 determines the uplink directional pattern of the antenna of each base station 102 and the transmission power of each terminal station 101.

When transfer functions necessary for control are input, processing by the intensive control station 103 advances from step S41 to S42. In step S42, a conventional adaptive antenna control algorithm (e.g., R. A. Monzingo and T. W. Miller, "Introduction to Adaptive Arrays", John Wiley & Sons, Inc. 1980) is applied to each base station 102, thereby obtaining the uplink weight vector of the adaptive antenna of each base station 102 for autonomous distributed control $$Wu(n) = Gt(m)\left(\sum_{k=1}^{K} Gt(k)^2 Vu(k,n)Vu(k,n)^H\right)^{-1} Vu(m,n) \quad (3)$$

$$Gt(m) = \frac{\mathrm{Re}(Wu(n)^H Vu(m,n))}{\sum_{k=1}^{N}(Wu(k)^H Vu(m,k)Vu(m,n)^H Wu(k)) + (Wu(n)^H Wu(n)|\sigma(m)|^2)} \quad (4)$$

where
σ (n): input noise power of nth base station
Wu(n): weight vector of nth adaptive antenna system
Re: real number portion
suffix H: complex conjugate transposition $$Wu(n) = \begin{pmatrix} wu(n,1) \\ wu(n,2) \\ \vdots \\ wu(n,P) \end{pmatrix}$$

wu(n,1) to wu(n,P): weights for antenna elements
P: number of antenna elements of nth base station Vu(m,n): transfer function vector of uplink communication between mth terminal station and nth base station $$Vu(m, n) = \begin{pmatrix} vu(m, n, 1) \\ vu(m, n, 2) \\ \vdots \\ vu(m, n, P) \end{pmatrix}$$

vu(m,n,1) to vu(m,n,P): transfer functions of antenna elements
N: number of base stations
K: number of terminal stations
Assume communication between nth base station and mth terminal station In step S43, the weight vector obtained in step S42 is substituted as an initial value into a weight vector Wu(n) of equation (27). In step S44, a transmission power Gt(m) of equation (28) is calculated. In step S45, the weight vector Wu(n) of equation (27) is re-calculated using the transmission power Gt(m).

Until the arithmetic result converges, calculations in steps S44 and S45 are alternately repeated. In step S46, it is identified whether the arithmetic result has converged. For this determination, for example, a signal-to-interference-power ratio in a communication channel with a lowest transmission quality is compared with a predetermined threshold value. That is, it can be regarded that the arithmetic result has converged when the transmission quality of a most degraded communication channel exceeds the lower limit value.

When the arithmetic result has converged, the flow advances from step S46 to S47 to transmit the weight vector Wu(n) as the final arithmetic result to each base station 102. In addition, the transmission power Gt(m) as the final arithmetic result is transmitted to each terminal station 101. In the second embodiment as well, the uplink directional patterns of the antennas of the plurality of base stations 102 and the transmission powers of the plurality of terminal stations 101 can be controlled altogether.

An arithmetic result convergence characteristic in executing the control shown in FIG. 5 was simulated using a computer. The same result as in FIG. 8 was obtained. That is, even in executing the control shown in FIG. 5, the uplink directional patterns of the base stations and the transmission powers of the terminal stations can be determined altogether such that the total interference power in the plurality of communication channels is minimized, as in the first embodiment.

Third Embodiment

Figure 10:
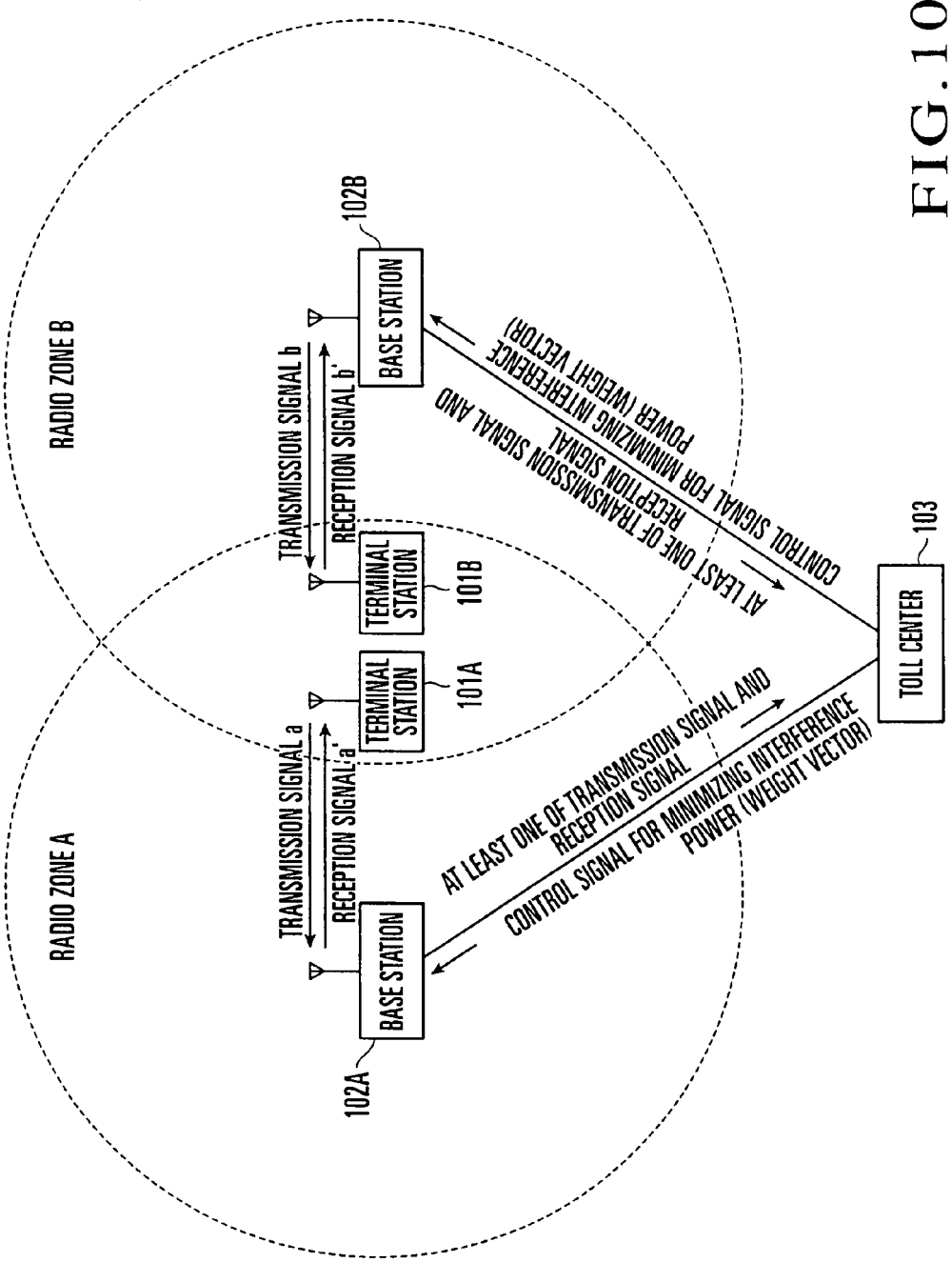
FIG. 10 is a view for explaining the third embodiment.

FIG. 10 shows the third embodiment. This third embodiment corresponds to claims 11 to 24.

Claims 11 and 12 are to control the directivity of the antenna of each base station on the basis of transmission/reception signals exchanged between two or more base stations and two or more terminal stations.

That is, as shown in FIG. 10, at least two terminal stations 101A and 101B are present in radio zones A and B of a plurality of base stations 102A and 102B. When the terminal stations 101A and 101B are transmitting/receiving radio wave signals to/from the base stations 102A and 102B, respectively, using the same communication channel with the same frequency and same timing, an intensive control station 103 receives through the terminal stations 101A and 101B at least one of the transmission signal from each of the terminal stations 101A and 101B and the reception signal at each of the terminal stations 101A and 101B, which is received and transmitted by each of the terminal stations 101A and 101B, generates weight vectors for minimizing the interference power on the basis of the received signals, and transmits the weight vectors to the base stations 102A and 102B as control signals to change the directivity characteristics of the antennas of the base stations 102A and 102B such that the interference power between the terminal stations 101A and 101B is reduced.

In this case, the base stations 102A and 102B are connected, and the above-described function of the intensive control station 103 is imparted to one of the base stations 102A and 102B, e.g., the base station 102A to cause the base station 102A to receive through the base station 102B a signal from the terminal station 101B that is communicating with the base station 102B and also receive a signal from the terminal station 101A connected to itself. On the basis of the received signals, the base station 102A generates control signals for reducing the interference power between the terminal stations 101A and 101B to change the directivity of antenna of itself and also to change the directivity characteristic of the antenna of the base station 102B by transmitting the generated control signal to the base station 102B. With this arrangement, the intensive control station 103 can be omitted.

As described in claim 13, the intensive control station 103 obtains the field strength and spatial correlation characteristic of each base station on the basis of a signal transferred from each base station and determines, on the basis of the obtained field strength and spatial correlation characteristic, a base station whose directivity characteristic of the antenna is to be changed.

Generally, when the terminal stations 101A and 101B which execute radio communication with the base stations 102A and 102B, respectively, are present on lines that connect the base stations 102A and 102B, as shown in FIG. 10, the spatial correlation characteristic of each of the base stations 102A and 102B is supposed to be high. In claim 13, when a plurality of base stations are present, the intensive control station 103 receives a signal transferred from each base station and obtains the field strength and spatial correlation characteristic of each base station on the basis of the received signal. When at least one of the base stations has a high spatial correlation characteristic, the base stations 102A and 102B which have high reception field levels and the positional relationship as shown in FIG. 10 are selected and determined as base stations whose directivity characteristics of the antennas are to be changed.

Figure 9:
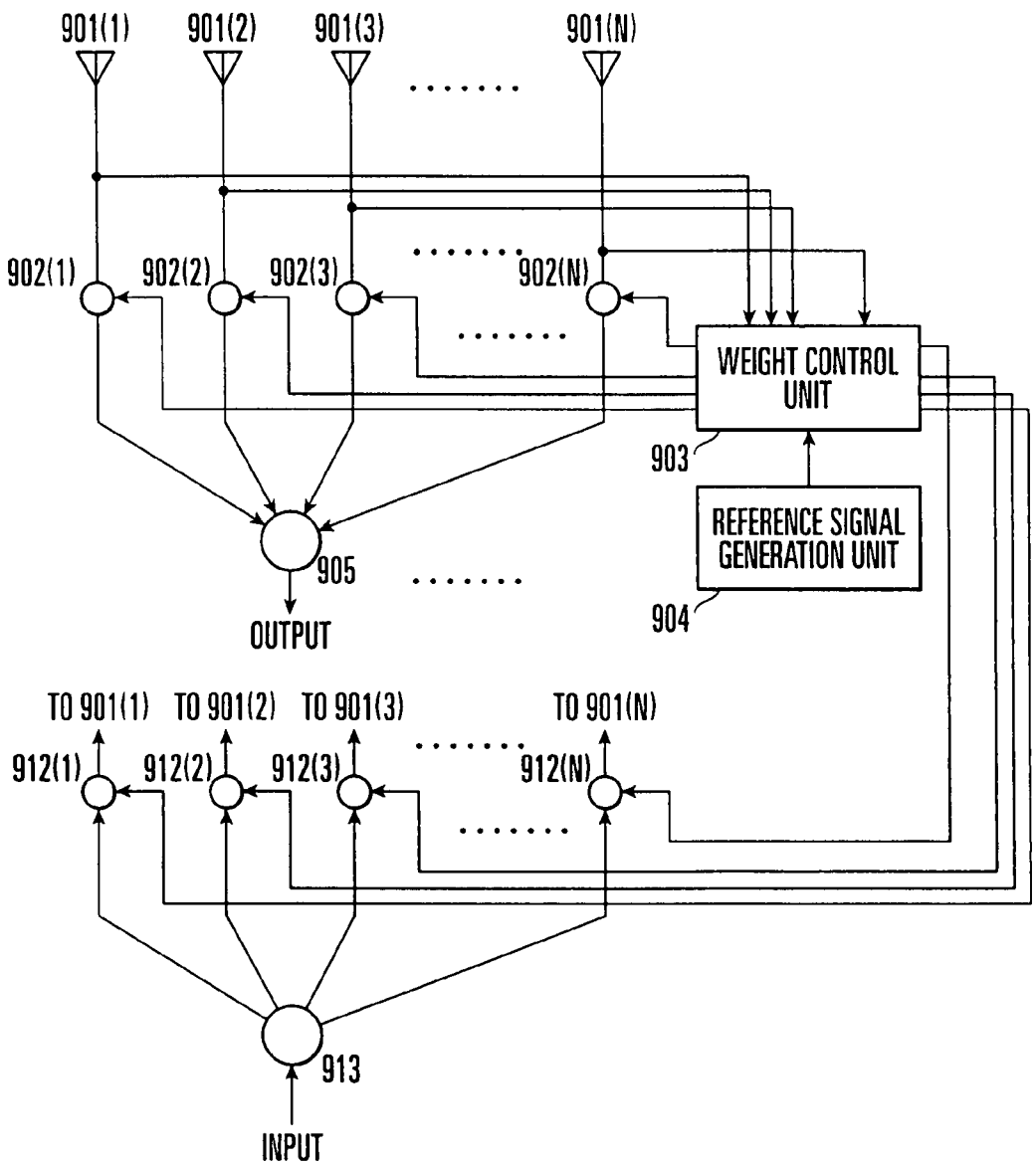
FIG. 9 is a block diagram showing the arrangement of an adaptive antenna.

In each of the base stations 102A and 102B, an antenna comprises a plurality of antenna elements 901, and weighting circuits 902 and 912 for respectively weighting the transmission/reception signals to/from the plurality of antenna elements, as shown in FIG. 9 described above. The directivity characteristic of the antenna is changed by causing the weighting circuits to weight the transmission/reception signals transmitted/received to/from the plurality of antenna elements. That is, as in claim 14, a base station has an adaptive antenna comprising an antenna formed from a plurality of antenna elements, and weighting circuits for respectively weighting the transmission/reception signals to/from the plurality of antenna elements, and the directivity characteristic of the antenna is changed by causing the weighting circuits to weight the transmission/reception signals transmitted/received to/from the plurality of antenna elements.

In the terminal stations 101A and 101B, upon receiving signals transmitted from the plurality of neighboring base stations 102A and 102B, transfer functions are estimated as described above by checking the correlation between the reception signals and known signals held by themselves in advance. The estimated transfer functions are transmitted to the base stations 102A and 102B. Upon receiving the transfer functions, the base stations 102A and 102B transmit the transfer functions to the intensive control station 103. As in claim 16, the intensive control station 103 calculates weight vectors using, as parameters, the transfer functions and the predicted values of the reception levels of the terminal stations. On the basis of the calculated weight vectors, the intensive control station 103 calculates the sum of square errors between the reception signals (i.e., transmission signals of the base stations 102A and 102B) at the terminal stations 101A and 101B using the same communication channel and desired signals d corresponding to the reception signals and repeatedly calculates the weight vectors by repeatedly changing the parameters until the sum of square errors becomes smaller than a predetermined threshold value. On the basis of weight vectors obtained when the sum of square errors becomes smaller than the threshold value, the weights of the antennas of the base stations 102A and 102B are determined. In this case, as in claim 15, the above-described function of the intensive control station 103 may be imparted to the base stations 102A and 102B such that the base stations 102A and 102B change the directivity characteristics of their antennas on the basis of the transfer functions received from the terminal stations 101A and 101B.

In this case, as in claim 17, on the basis of the calculated weight vectors, the sum of square errors between the reception signals at the terminal stations 101A and 101B using the same communication channel and the desired signals d corresponding to the reception signals may be calculated, and the weight vectors may be repeatedly calculated by repeatedly changing the parameters until the maximum value of square errors at the terminal stations 101A and 101B becomes smaller than. a predetermined threshold value. On the basis of weight vectors obtained when the maximum of square errors becomes smaller than the threshold value, the weights of the antennas of the base stations 102A and 102B may be determined.

The above method can be actually realized by executing the processing in steps S23 to S26 shown in the flow chart of FIG. 4. That is, as in claim 18, a weight vector obtained in step S22 of FIG. 4 is substituted as an initial value into a weight vector Wd(n) of equation (25). In step S24, a gain (the reciprocal of the predicted value of the reception level) G(m) of equation (26) is calculated. In step S25, the weight vector Wd(n) of equation (25) is re-calculated using the gain G(m). Until the arithmetic result converges, calculations in steps S24 and S25 are alternately repeated. In this case, as in claim 19, a signal-to-interference-power ratio in a communication channel with a lowest transmission quality may be defined as the threshold value, and the weights of the antennas of the base stations 102A and 102B may be determined on the basis of the weight vectors obtained when the maximum value of the square errors becomes smaller than the threshold value.

In the base stations 102A and 102B, upon receiving signals transmitted from the terminal stations 101A and 101B, transfer functions are estimated as described above by checking the correlation between the reception signals and known signals held by themselves in advance. The estimated transfer functions are transmitted to the intensive control station 103. As in claim 21, the intensive control station 103 calculates weight vectors using, as parameters, the transfer functions and transmission power values to be set for the terminal stations 101A and 101B. On the basis of the calculated weight vectors, the intensive control station 103 calculates the sum of square errors between the transmission signals (i.e., the reception signals of the base stations 102A and 102B) at the terminal stations 101A and 101B using the same communication channel and the desired signals d corresponding to the transmission signals and repeatedly calculates the weight vectors by repeatedly changing the parameters until the sum of square errors becomes smaller than a predetermined threshold value. On the basis of weight vectors obtained when the sum of square errors becomes smaller than the threshold value, the weights of the antennas of the base stations 102A and 102B are determined. In this case, as in claim 20, the above-described function of the intensive control station 103 may be imparted to the base stations 102A and 102B such that the base stations 102A and 102B change the directivity characteristics of their antennas on the basis of the transfer functions estimated by themselves.

In this case, as in claim 22, on the basis of the calculated weight vectors, the sum of square errors between the transmission signals at the terminal stations 101A and 101B using the same communication channel and the desired signals d corresponding to the transmission signals may be calculated, and the weight vectors may be repeatedly calculated by repeatedly changing the parameters until the maximum value of square errors at the terminal stations 101A and 101B becomes smaller than a predetermined threshold value. On the basis of weight vectors obtained when the maximum of square errors becomes smaller than the threshold value, the weights of the antennas of the base stations 102A and 102B may be determined.

The above method can be actually realized by executing the processing in steps S43 to S46 shown in the flow chart of FIG. 5. That is, as in claim 23, a weight vector obtained in step S43 of FIG. 5 is substituted as an initial value into a weight vector Wu(n) of equation (27). In step S44, a transmission power Gt(m) of equation (28) is calculated. In step S45, the weight vector Wu(n) of equation (27) is re-calculated using the transmission power Gt(m).

Until the arithmetic result converges, calculations in steps S44 and S45 are alternately repeated. In this case, as in claim 24, a signal-to-interference-power ratio in a communication channel with a lowest transmission quality may be defined as the threshold value, and the weights of the antennas of the base stations 102A and 102B may be determined on the basis of the weight vectors obtained when the maximum value of the square errors becomes smaller than the threshold value.

As has been described above, according to the present invention, since a plurality of adaptive antennaes each having an interference reduction capability are controlled altogether such that the total interference power at the terminal stations is minimized in the downlink and the total interference power at the base stations is minimized in the uplink communication, the interference can be reduced in the entire system both for the uplink and downlink communications.

Hence, the distance between base stations which use the same frequency can be made shorter than in a conventional adaptive antenna. That is, the frequency use efficiency can be improved, and a high-speed radio communication system that requires a wide frequency band can be implemented within a limited band.

What is claimed is:

1. An adaptive antenna transmission/reception characteristic control method characterized in that
when a plurality of terminal stations are present in a radio zone where a plurality of radio base stations each having an antenna are present, and at least two of the plurality of terminal stations are transmitting/receiving radio wave signals to/from different radio base stations using the same communication channel with the same signal transmission/reception frequency and same signal transmission/reception timing, a transfer function obtained from at least one of i) a transmission signal from each terminal station and ii) a reception signal at each terminal station, which is received by and transmitted from each of the terminal stations, is received through the plurality of radio base stations that each communicates with each of the terminal stations, and a weight vector of which a square error between the reception, signal and a desired signal corresponding thereto smaller than a predetermined threshold is selected on the basis of the received transfer function to thereby change a directivity characteristic of the antenna of each base station so as to reduce an interference power between the terminal stations.

2. A method according to claim 1, wherein
the transmission/reception signals of the terminal stations using the same communication channel, which are received through the radio base station, are transferred to an intensive control station, and
the intensive control station generates, on the basis of the transferred signals, a control signal for reducing the interference power between the terminal stations and transmits the control signal to each radio base station, thereby changing the directivity characteristic of the antenna of each radio base station.

3. A method according to claim 2, wherein the intensive control station obtains a field strength and spatial correlation characteristic of each radio base station on the basis of the transferred signals and, on the basis of the obtained field strength and spatial correlation characteristic, determines a base station whose directivity characteristic of the antenna is to be changed.

4. A method according to claim 1, wherein each radio base station having an adaptive antenna comprising the antenna formed from a plurality of antenna elements and weighting circuits for respectively weighting transmission/reception signals of the plurality of antenna elements, and the weighting circuits weight the transmission/reception signals transmitted/received from/by the plurality of antenna elements, thereby changing the directivity characteristic of the antenna.

5. A method according to claim 4, wherein
upon receiving signals transmitted from the plurality of neighboring radio base stations, each terminal station estimates the transfer function by checking a correlation between each of the reception signals and a known signal which is held by the terminal station in advance and transmits the transfer function to the radio base station, and
each radio base station changes the directivity characteristic of the antenna on the basis of the received transfer function.

6. A method according to claim 5, wherein
each radio base station transmits to the intensive control station the transfer unction transmitted from each terminal station, and
the intensive control station calculates a weight vector Wd(i) (i=1 to n: n is the total number of terminal stations), using as parameters, the transfer function and a predicted value 1/G(i) (i=1 to n: n is the total number of terminal stations) of a reception level of each terminal station,
on the basis of the calculated weight vector Wd(i), calculates a sum of square errors between the reception signals at the terminal stations which simultaneously use the same communication channel with the same frequency and same timing and desired signals corresponding to the reception signals and repeatedly calculates the weight vector Wd(i) while repeatedly changing the parameters until the sum of the square errors becomes smaller than a predetermined threshold value, and
determines the weight of the antenna of each radio base station on the basis of the weight vector Wd(i) obtained when the sum of the square errors becomes smaller than the threshold value.

7. A method according to claim 6, wherein equation (5) representing a weight vector Wd(n) of a transmission system, which is to be given to the weighting circuit of the adaptive antenna of an nth radio base station, and equation (6) representing a predicted value 1/G(m) of the reception level of an mth terminal station, which is obtained by a directional pattern generated by the adaptive antenna, are alternately repeatedly calculated, and the weight vector Wd(n) of a calculation result which has converged is used as a value of the weight to be given to each weighting circuit:

$$Wd(n) = G(m)\left(\sum_{k=1}^{K} G(k)^2 Vd(k,n) Vd(k,n)^H\right)^{-1} Vd(m,n) \quad (5)$$

$$G(m) = \frac{\text{Re}(Wd(n)^H Vd(m,n))}{\sum_{k=1}^{N} (Wd(k)^H Vd(m,k) Vd(m,k)^H Wd(k)) + |\sigma(m)|^2} \quad (6)$$

where
σ(m): noise power of mth terminal station
Re: real number portion
suffix H: complex conjugate transposition $$Wd = \begin{pmatrix} wd(n,) \\ wd(n,2) \\ \vdots \\ wd(n,P) \end{pmatrix}$$

wd(n,1) to wd(n,P): weights for antenna elements
P: number of antenna elements of nth base station
Vd(m,n): transfer function vector of downlink communication between mth terminal station and nth base station $$Vd(m,n) = \begin{pmatrix} vd(m,n,1) \\ vd(m,n,2) \\ \vdots \\ vd(m,n,P) \end{pmatrix}$$

vd(m,n,1) to vd(m,n,P): transfer functions of antenna elements
N: number of base stations
K: number of terminal stations
Assume communication between nth base station and mth terminal station.

8. A method according to claim 5, wherein
each radio base station transmits to the intensive control station the transfer function ransmitted from each terminal station, and
the intensive control station calculates a weight vector Wd(i) (i=1 to n: n is the total number of terminal stations), using as parameters, the transfer function and a predicted value 1/G(i) (i=1 to n: n is the total number of terminal stations) of a reception level of each terminal station, on the basis of the calculated weight vector Wd(i), calculates a sum of square errors between the reception signals at the terminal stations which simultaneously use the same communication channel with the same frequency and same timing and desired signals corresponding to the reception signals and repeatedly calculates the weight vector Wd(i) while repeatedly changing the parameters until a maximum value of the square errors at each terminal station becomes smaller than a predetermined threshold value, and determines the weight of the antenna of each radio base station on the basis of the weight vector Wd(i) obtained when the maximum value of the square errors becomes smaller than the threshold value.

9. A method according to claim 8, wherein equation (7) representing a weight vector Wd(n) of a transmission system, which is to be given to the weighting circuit of the adaptive antenna of an nth radio base station, and equation (8) representing a predicted value 1/G(m) of the reception level of an mth terminal station, which is obtained by a directional pattern generated by the adaptive antenna, are alternately repeatedly calculated, and the weight vector Wd(n) of a calculation result which has converged is used as a value of the weight to be given to each weighting circuit:

$$Wd(n) = G(m)\left(\sum_{k=1}^{K} G(k)^2 Vd(k,n)Vd(k,n)^H\right)^{-1} Vd(m,n) \quad (7)$$

$$G(m) = \frac{\text{Re}(Wd(n)^H Vd(m,n))}{\sum_{k=1}^{N} (Wd(k)^H Vd(m,k)Vd(m,k)^H Wd(k)) + |\sigma(m)|^2} \quad (8)$$

σ(m): noise power of mth terminal station
Re: real number portion
suffix H: complex conjugate transposition $$Wd(n) = \begin{pmatrix} wd(n,) \\ wd(n,2) \\ \vdots \\ wd(n,P) \end{pmatrix}$$

wd(n,1) to wd(n,P): weights for antenna elements P: number of antenna elements of nth base station
Vd(m,n): transfer function vector of downlink communication between mth terminal station and nth base station $$Vd(m,n) = \begin{pmatrix} vd(m,n,1) \\ vd(m,n,2) \\ \vdots \\ vd(m,n,P) \end{pmatrix}$$

vd(m,n,1) to vd(m,n,P): transfer functions of antenna elements
N: number of base stations
K: number of terminal stations
Assume communication between nth base station and mth terminal station.

10. A method according to claim 4, wherein upon receiving signals transmitted from the plurality of neighboring terminal stations, each radio base station estimates the transfer function by checking a correlation between each of the reception signals and a known signal which is held by the radio base station in advance and changes the directivity characteristic of the antenna of the radio base station on the basis of the transfer function.

11. A method according to claim 10, wherein each radio base station transmits the transfer function to the intensive control station, and the intensive control station calculates a weight vector Wu(i) (i=1 to n: n is the total number of terminal stations), using as parameters, the transfer function and a transmission power value G(i) (i 1 to n: n is the total number of terminal stations) set for each terminal station, on the basis of the calculated weight vector Wu(i), calculates a sum of square errors between the transmission signals at the terminal stations which simultaneously use the same communication channel with the same frequency and same timing and desired signals corresponding to the transmission signals and repeatedly calculates the weight vector Wu(i) while repeatedly changing the parameters until the sum of the square errors becomes smaller than a predetermined threshold value, and determines the weight of the antenna of each radio base station on the basis of the weight vector Wu(i) obtained when the sum of the square errors becomes smaller than the threshold value.

12. A method according to claim 11, wherein equation (9) representing a weight vector Wu(n) of a reception system, which is to be given to the weighting circuit of the adaptive antenna of an nth radio base station, and equation (10) representing a transmission power Gt(m) of an mth terminal station are alternately repeatedly calculated, and the weight vector Wu(n) of a calculation result which has converged is used as a weight to be given to each weighting circuit:

$$Wu(n) = G(m)\left(\sum_{k=1}^{K} G(k)^2 Vu(k,n)Vu(k,n)^H\right)^{-1} Vu(m,n) \quad (3)$$

$$Gt(m) = \frac{\text{Re}(Wu(n)^H Vu(m,n))}{\sum_{k=1}^{N} (Wu(k)^H Vu(m,k)Vu(m,k)^H Wu(k)) + (Wu(n)^H Wu(n)|\sigma(m)|^2)} \quad (4)$$

where
σ(n): input noise power of nth base station
Wu(n): weight vector of nth adaptive antenna system
Re: real number portion
suffix H: complex conjugate transposition $$Wu(n) = \begin{pmatrix} wu(n,1) \\ wu(n,2) \\ \vdots \\ wu(n,P) \end{pmatrix}$$

wu(n,1) to wu(n,P): weights for antenna elements
P: number of antenna elements of nth base station
Vu(m,n): transfer function vector of uplink communication between mth terminal station and nth base station $$Vu(m, n) = \begin{pmatrix} vu(m, n, 1) \\ vu(m, n, 2) \\ \vdots \\ vu(m, n, P) \end{pmatrix}$$

vu(m,n,1) to vu(m,n,P): transfer functions of antenna elements

N: number of base stations

K: number of terminal stations

Assume communication between nth base station and mth terminal station.

13. A method according to claim 10, wherein each radio base station transmits the transfer function to the intensive control station, and the intensive control station calculates a weight vector Wu(i) (i=1 to n: n is the total number of terminal stations), using as parameters, the transfer function and a transmission power value G(i) (i=1 to n: n is the total number of terminal stations) set for each terminal station, on the basis of the calculated weight vector Wu(i), calculates a sum of square errors between the transmission signals at the terminal stations which simultaneously use the same communication channel with the same frequency and same timing and desired signals corresponding to the transmission signals and repeatedly calculates the weight vector Wu(i) while repeatedly changing the parameters until a maximum value of the square errors at each terminal station becomes smaller than a predetermined threshold value, and determines the weight of the antenna of each radio base station on the basis of the weight vector Wu(i) obtained when the maximum value of the square errors becomes smaller than the threshold value.

14. A method according to claim 13, wherein equation (11) representing a weight vector Wu(n) of a reception system, which is to be given to the weighting circuit of the adaptive antenna of an nth radio base station, and equation (12) representing a transmission power Gt(m) of an mth terminal station are alternately repeatedly calculated, and the weight vector Wu(n) of a calculation result which has converged is used as a weight to be given to each weighting circuit:

$$Wu(n) = G(m)\left(\sum_{k=1}^{K} G(k)^2 V(k, n) Vd(k, n)^H\right)^{-1} Vd(m, n) \quad (3)$$

$$Gt(m) = \frac{Re(Wu(n)^H Vu(m, n))}{\sum_{k=1}^{N}(Wu(k)^H Vu(m, k) Vu(m, k)^H Wu(k)) + (Wu(n)^H Wu(n)|\sigma(m)|^2)} \quad (4)$$

where a(n): input noise power of nth base station

Wu(n): weight vector of nth adaptive antenna system

Re: real number portion suffix H: complex conjugate transposition $$Wu(n) = \begin{pmatrix} wu(n, 1) \\ wu(n, 2) \\ \vdots \\ wu(n, P) \end{pmatrix}$$

wu(n,1) to wu(n,P): weights for antenna elements

P: number of antenna elements of nth base station

Vu(m,n): transfer function vector of uplink communication between mth terminal station and nth base station $$Vu(m, n) = \begin{pmatrix} vu(m, n, 1) \\ vu(m, n, 2) \\ \vdots \\ vu(m, n, P) \end{pmatrix}$$

vu(m,n,1) to vu(m,n,P): transfer functions of antenna elements

N: number of base stations

K: number of terminal stations

Assume communication between nth base station and mth terminal station.

* * * * *

UNITED STATES PATENT AND TRADEMARK OFFICE
CERTIFICATE OF CORRECTION

| | | |
|---|---|---|
| PATENT NO. | : 8,078,113 B2 | Page 1 of 1 |
| APPLICATION NO. | : 11/975245 | |
| DATED | : December 13, 2011 | |
| INVENTOR(S) | : Yasushi Takatori et al. | |

It is certified that error appears in the above-identified patent and that said Letters Patent is hereby corrected as shown below:

On Page 2, in Foreign Patent Documents, Japanese Patent 07066768 3/1995 is duplicated as 7-066768 33/1995. Please remove duplicate reference.

In the Claims, Column 15, Claim 6, line 55, please delete "unction" and insert --function--.

Signed and Sealed this
Second Day of October, 2012

David J. Kappos
*Director of the United States Patent and Trademark Office*